B. E. BYRD.
KNOTTER.
APPLICATION FILED MAR. 17, 1917.

1,259,955.

Patented Mar. 19, 1918.
2 SHEETS—SHEET 1.

Witness
J. R. Tomey
T. L. Parker

Inventor
B. E. Byrd
By C. A. Snow & Co.
Attorneys

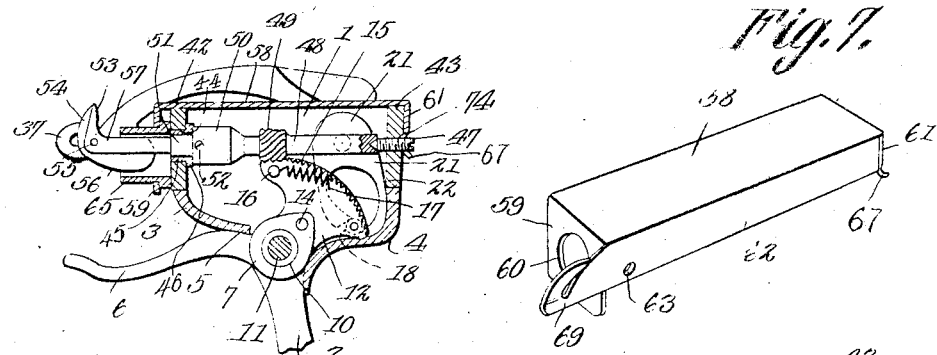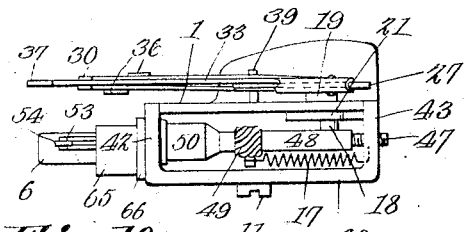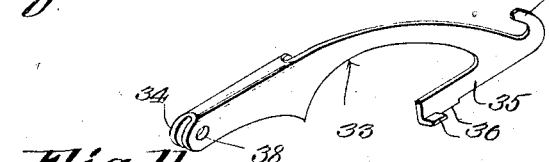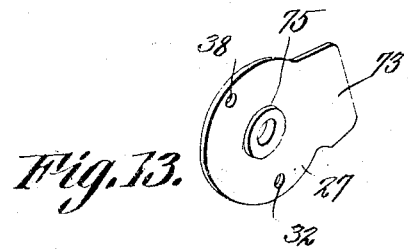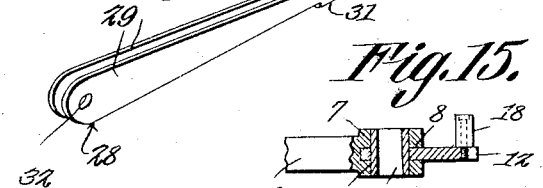

UNITED STATES PATENT OFFICE.

BRITTON E. BYRD, OF DURHAM, NORTH CAROLINA.

KNOTTER.

1,259,955.

Specification of Letters Patent.  Patented Mar. 19, 1918.

Application filed March 17, 1917.  Serial No. 155,551.

*To all whom it may concern:*

Be it known that I, BRITTON E. BYRD, a citizen of the United States, residing at Durham, in the county of Durham and State of North Carolina, have invented a new and useful Knotter, of which the following is a specification.

The device forming the subject matter of this application is a hand-carried knotter, adapted to tie together the ends of a severed thread.

The invention aims to improve the kick-off and the means whereby the kick-off is actuated.

Another object of the invention is to improve the means whereby the tying shaft is actuated.

Another object of the invention is to improve the top closure so that the same will serve as a support for the cam thimble and constitute also a support for the thread.

It is within the province of the disclosure to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawings:—

Fig. 6 is a fragmental longitudinal section of the knotter;

Fig. 7 is a perspective delineating the top closure;

Fig. 8 is a perspective showing the cam thimble;

Fig. 9 is a perspective disclosing the side closure;

Fig. 10 is a top plan of the complete knotter, the top closure shown in Fig. 7 having been removed;

Fig. 11 is a perspective showing one arm of the kick-off mechanism;

Fig. 12 is a perspective showing the cam plate;

Fig. 13 is a perspective showing the actuating disk wherewith the arms of the kick-off mechanism are assembled;

Fig. 14 is a perspective showing the other arm of the kick-off mechanism; and

Fig. 15 is a fragmental elevation showing a portion or the thumb lever and the segment which is carried thereby, parts appearing in section.

Figure 1:
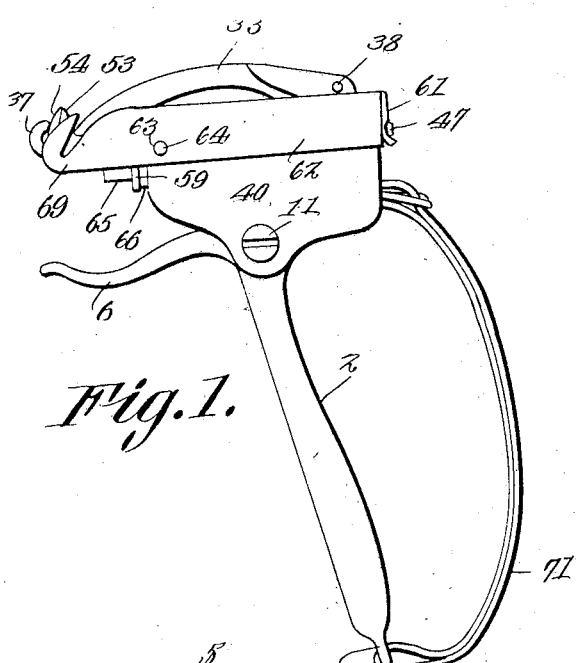
Figure 1 shows in side elevation, a hand-carried knotter constructed in accordance with the present invention.
Figure 2:
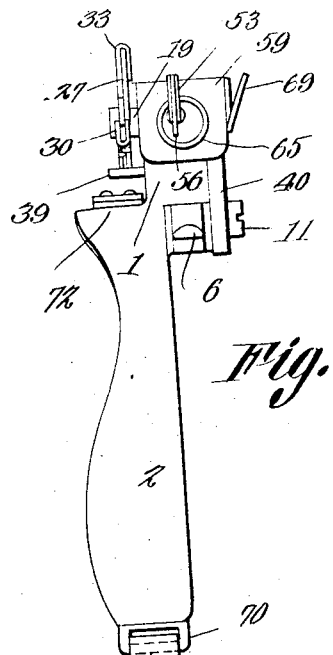
Fig. 2 is an end view of the knotter.

In carrying out the present invention there is provided a head 1 in the form of a plate, having a depending handle 2. Projecting laterally from the head 1 is a forward flange 3 and a rear flange 4, the lower ends of the flanges 3 and 4 being spaced apart to define an opening 5. A thumb lever 6 passes through the opening 5 and includes an enlargement 7 having a bore 9 and a slot 8 at right angles to the bore. Mounted in the bore 9 is a sleeve 10. Through the sleeve 10 passes a screw 11 which is threaded into the head 1. A fulcrum for the thumb lever 6 thus is provided. A segment 12 is inserted into the slot 8 and is held therein by a pin 14 mounted in the enlargement 7. The sleeve 10 passes through the segment 12 and aids in holding the segment in place. The teeth of the segment 12 are denoted by the reference character 15. On one side, the segment 12 has a pin 16 with which is connected one end of a retractile spring 17, the inner end of which may be secured to the rear flange 4. A roller 18 is mounted for rotation on one side of the segment 12. A spacing lug 19 projects from the outer face of the head 1, and journaled therein is a shaft 20 which may be a screw, the inner end of the shaft 20 being mounted in one end of a plate or arm 21 located on the inside of the head 1 and provided with a cam slot 22, certain points of which are denoted in Fig. 12 by the reference numerals 23, 24 and 25. In the edge of the plate 21 there is an opening 26 communicating with the cam slot 22. The roller 18 on the segment 12 lies within the cam slot 22 and coöperates with parts thereof in a manner which will be pointed out hereinafter.

A disk 27 is secured to the outer end of the shaft 20 and includes an extension 73. With the disk 27 is assembled the kick-off mechanism, the same including an arm 28 comprising spaced parts 29 having fingers 30, the parts 29 of the arm 28 being joined, near to the fingers 30, by a web 31. The arm 28 is pivoted at 32 to the disk 27, and the extension 73 of the disk moves between the parts 29 of the arm 28. The other arm of the kick-off mechanism is denoted by the numeral 33 and is supplied at its rear end with a flange 34. The arm 33 has an extension 35 provided on its lower edge and near its free end with oppositely extended projections 36. The arm 33 terminates in a hook 37. The edge of the disk 27 lies between the body portion of the arm 33 and the flange 34 and is pivoted to these parts as shown at 38. The part 73 of the disk 27 is also received between the flange 34 and the body portion of the arm 33. The extension 35 lies between the parts 29 of the arm 28, the projections 36 engaging the under edges of the parts 29 of the arm. The lower edge of the hook 37 slides on the web 31 of the arm 28. The arms 33 and 28 thus are connected together for relative longitudinal movement, and for a slight and almost imperceptible transverse movement. Under normal conditions, the arm 28 rests on a pin 39 projecting from the outer face of the head 1.

The invention comprises a side closure 40 shown in Fig. 9. The closure 40 has an opening 41 through which the screw 11 passes, the side closure being secured in this way to the head 1. The side closure 40 has end flanges 42 and 43. The end flange 42 rests on the flange 3 of the head 1, and the end flange 43 rests on the flange 4 of the head 1. In the flange 42 there is an opening 44 receiving a bushing 45 having a flange 46 engaging the inner face of the member 42. A bearing screw 47 is threaded into flange 43 and on the bearing screw is journaled one end of a tying shaft 48 carrying a worm 49 engaged by the teeth 15 of the segment 12. The tying shaft 48 terminates in a socket 50, receiving a supplemental shaft 51 held in place by a securing element 52 which may be a set screw. The shaft 51 carries the shank 57 of a tying bill 53 coöperating with a tying bill 54 pivoted at 55 to the shank 57. The tying bill 54 has an edge 56 which projects beyond the shank 57, as clearly shown in Fig. 6.

The invention comprises a top closure 58 shown in Fig. 7 and including an end wall 59 having an opening 60. The top closure 58 is supplied with a spring tongue 61 having a shoulder 67 adapted to be received in a groove 68 formed in the end flange 43. The spring tongue 61 is supplied with a notch 74 which receives the end of the bearing screw 47. The top closure 58 comprises a side wall 62 having a forwardly presented thread support 69. In the side wall 62 is fashioned an opening 63 adapted to receive a pin 64 on the side closure 40. Located in the opening 44 of the flange 42 is a cam thimble 65 having a flange 66 which engages the inner face of the end wall 59. When the top closure 58 is in place, the axis of the cam thimble 65 is not coincident with the axis of rotation of the shafts 51—48, the shaft 51 being journaled in the bushing 45, as Fig. 6 will clearly disclose, the cam thimble 65 being eccentrically disposed with respect to the bushing.

It may be found expedient to place a loop 70 on the handle 2, adapted to receive one member of a two-part strap 71, the other member of which is secured to the handle 2 near to the upper end thereof, the handle being offset as shown at 72, to form a ledge to which the upper end of the strap may be secured. Obviously, the strap 71 aids in holding the structure on the hand of the operator, the handle 2 being gripped.

When the device is not in use, the parts are arranged as follows:—

The spring 17 swings the segment 12 and the thumb lever 6 on the screw 11 until one end of the segment abuts against the rear flange 4 as shown in Fig. 6. The roller 18 on the segment 12 lies in the opening 26 of the plate 21. The arm 28 of the kick-off mechanism rests on the pin 39, and the hook 37 on the arm 33 is advanced beyond the fingers 30 of the arm 28. The parts are thus shown in Fig. 4. The ends of a pair of threads which are to be tied, are placed in the thread support 69 and in the hook 37 of the arm 33. The thumb lever 6 is then depressed, and the segment 12, coacting with the worm 49 on the tying shaft 48, rotates the tying shaft. When the tying shaft is rotated, the tying bills 53 and 54 coöperate to knot the ends of the thread together and sever the thread in front of the knot, the edge 56 of the tying bill 54 coöperating with the cam thimble 65 to produce the necessary movement between the tying bills 53 and 54. An extended description of the manner in which the bills 53 and 54 operate, need not be given, because these structures are known in the art. During the time that the tying shaft 48 is being rotated by the segment 12, the roller 18 on the segment moves from the point 23 of the cam slot 22 to a point represented approximately by the reference numeral 24 in Fig. 12. The roller 18, in effect, crosses the cam slot 22, without actuating the plate 21, during the time that the ends of the thread are being tied and severed. After this operation has been carried out, the roller 18 moves from the point 23 of the cam slot 22 to the point 25 thereof. This operation actuates the plate 21 and rotates the shaft 20. When the shaft 20 is rotated, the disk 27 secured thereto produces relative longitudinal movement between the arms 33 and 28 of the kick-off mechanism, the threads being held in the hook 37 by the fingers 30. If the lever 6 be pushed downwardly from the solid line position of Fig. 4 to the dotted line position of said figure, the arms 28 and 33 will be raised up into the dotted line position of Fig. 4, and the knotted threads being carried up to the rear of the tying bills 53 and 54, above the top closure 58. When the disk 27 is rotated to raise the arms 28 and 33 of the kick-off mechanism, and after the arm 28 is clear of the pin 39, the arms do not tend to swing downwardly, independently of the disk 27, because this disk has a hub 75 on one side (Fig. 13) which supports the arm 33 when the kick-off mechanism is in the elevated position shown in Fig. 4.

Figure 3:
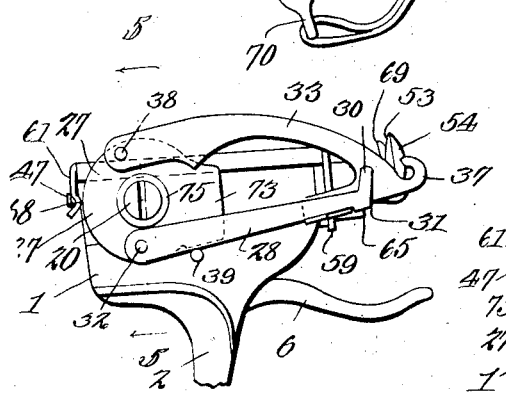
Fig. 3 is a fragmental side elevation, showing that face of the device which carries the kick-off, the parts being in their normal positions.
Figure 4:
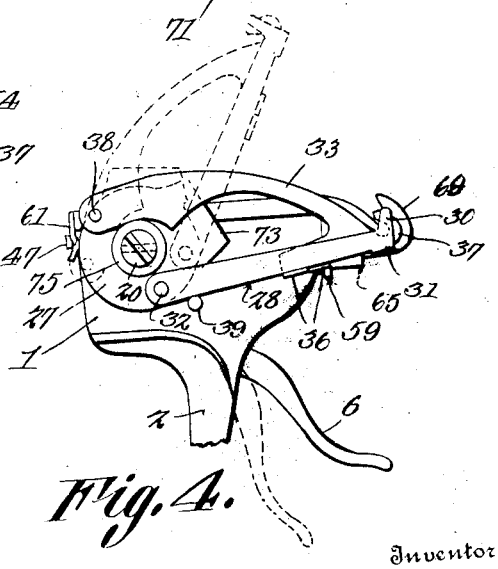
Fig. 4 is a side elevation similar to Fig. 3, but showing the parts in the positions which they will assume after the knot has been tied, and before the kick-off has completed its function.
Figure 5:
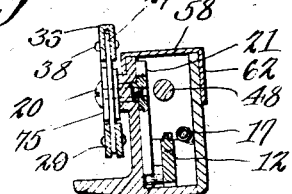
Fig. 5 is a section on the line 5—5 of Fig. 3.

In addition to the novel means whereby the kick-off mechanism of Figs. 3 and 4 is actuated, and in addition to other structural peculiarities of the device, it is to be observed that the closure 40 constitutes a support for the shafts 48 and 51. Further, the top closure 58 carries the thread support 69, and serves, as well, as a means for carrying the cam thimble 65. The top closure 58 may be attached and removed at any time. The opening 63 and the side 62 of the top closure receive the pin 64 in the side closure 40, and the shoulder 67 on the spring tongue 61, being received in the groove 68 of the flange 43, aids in holding the closure 58 in place removably. Since the bearing screw 47 is received in the notch 74 of the spring tongue 61, a lateral movement of the top closure 58 is prevented.

Having thus described the invention, what is claimed is:—

1. In a hand knotter, a supporting structure; a tying shaft journaled therein; a lever fulcrumed on the supporting structure; a segment carried by the lever; a worm on the tying shaft whereinto the segment meshes; a second shaft journaled in the supporting structure; a kick-off mechanism actuated by the second shaft, an arm on the second shaft and provided with a cam slot; and a projection on the segment and coacting with the cam slot.

2. In a hand knotter, a supporting structure; a shaft journaled in the supporting structure; a disk carried by the shaft; a kick-off mechanism embodying upper and lower arms pivoted to the disk, the arms being interengaged for relative longitudinal movement, one arm having a finger, and the other arm having a hook wherewith the finger coacts; means on the supporting structure for upholding the lower arm when the arms are lowered; means for supporting the upper arm when the arms are raised; a tying shaft journaled in the supporting structure; and an operative connection between the shafts.

3. In a hand knotter, a handle provided with a head; a side closure disposed opposite to the head and provided with an end wall; means for connecting the side closure to the head; a tying shaft journaled in the end wall; tying bills carried by the tying shaft; a removable top closure coöperating with the side closure; and a cam thimble carried by the top closure and constituting means for actuating one of the bills.

4. In a hand knotter, a supporting structure; a tying shaft journaled therein; a top closure provided with integral end walls, one of which is in the form of a spring tongue interengaged with the side closure, the top closure being provided with a side flange prolonged to form a thread support; and tying bills carried by the tying shaft, the thread support coacting with the tying bill.

In testimony that I claim the foregoing as my own, I have hereto affixed my signature in the presence of two witnesses.

BRITTON E. BYRD.

Witnesses:
W. C. BRADSHAW,
W. N. HOLLOWAY.